(12) United States Patent
Park et al.

(10) Patent No.: US 11,465,290 B2
(45) Date of Patent: Oct. 11, 2022

(54) ROBOT CAPABLE OF CONVERSATION WITH ANOTHER ROBOT AND METHOD OF CONTROLLING THE SAME

(71) Applicant: LG ELECTRONICS INC., Seoul (KR)

(72) Inventors: Ji Yoon Park, Seoul (KR); Jungkwan Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 631 days.

(21) Appl. No.: 16/555,923

(22) Filed: Aug. 29, 2019

(65) Prior Publication Data

US 2019/0389073 A1 Dec. 26, 2019

(30) Foreign Application Priority Data

Jul. 16, 2019 (KR) .................. 10-2019-0085956

(51) Int. Cl.
| | |
|---|---|
| *G10L 15/22* | (2006.01) |
| *B25J 11/00* | (2006.01) |
| *B25J 9/00* | (2006.01) |
| *B25J 9/16* | (2006.01) |

(Continued)

(52) U.S. Cl.
CPC ......... *B25J 11/0005* (2013.01); *B25J 9/0003* (2013.01); *G10L 15/22* (2013.01); *B25J 9/1697* (2013.01); *B25J 13/003* (2013.01); *G06F 16/90332* (2019.01)

(58) Field of Classification Search
CPC .... B25J 11/0005; B25J 9/0003; B25J 9/1697; B25J 13/003; B25J 11/00; B25J 9/1664; B25J 9/1679; B25J 13/08; B25J 19/02; G10L 15/22; G10L 13/027; G10L 2015/223; G10L 2015/226; G06F 16/90332

See application file for complete search history.

(56) References Cited

U.S. PATENT DOCUMENTS

| | | | | |
|---|---|---|---|---|
| 6,330,539 | B1* | 12/2001 | Takayama | ........... G10L 15/1822 704/251 |
| 2019/0111567 | A1* | 4/2019 | Kuwamura | ............ G06V 40/20 |

FOREIGN PATENT DOCUMENTS

WO  WO-2020141636 A1 *  7/2020

* cited by examiner

*Primary Examiner* — Abul K Azad
(74) *Attorney, Agent, or Firm* — Birch, Stewart, Kolasch & Birch, LLP

(57) ABSTRACT

A robot capable of conversation with another robot and a method of controlling the same are disclosed. The robot includes a main body having a first region corresponding to a human face and rotatable in left-right direction directions, a signal generator generating a first data signal to be transmitted to a listener robot and a first robot voice signal corresponding to the first data signal, a communication unit transmitting the first data signal to an external server, a speaker outputting the first robot voice signal, and a controller controlling a rotation direction of the main body such that the first region is directed toward the listener robot at a time point adjacent to a transmission time of the first data signal and controlling the speaker to output the first robot voice signal after the rotation direction of the robot is controlled, wherein the listener robot receives the first data signal transmitted from the external server and is controlled to operate based on the first data signal.

17 Claims, 6 Drawing Sheets

(51) Int. Cl.
*B25J 13/00* (2006.01)
*G06F 16/9032* (2019.01)

ROBOT CAPABLE OF CONVERSATION WITH ANOTHER ROBOT AND METHOD OF CONTROLLING THE SAME

CROSS-REFERENCE TO RELATED APPLICATION

This application claims the benefit of Korean Patent Application 10-2019-0085956, filed on Jul. 16, 2019 in the Korean Intellectual Property Office, the entire disclosure of which is incorporated herein by reference.

FIELD

The present invention relates to a robot capable of conversation with another robot and a method of controlling the same.

BACKGROUND

A robot refers to a machine configured to automatically operate or process a given task. The robot may include an actuator or a motor to perform various physical operations, such as movement of robot joints. In addition, a movable robot may be provided with a wheel, a brake, a propeller, and the like in a driving unit to travel on the ground or to fly in the air. Robots can be classified into industrial, medical, household, and military robots depending upon purpose or field of use.

Voice for conversation is the most natural communication means and various techniques for enabling conversation between a robot and a user have been disclosed in the art. However, a technique for enabling voice conversation between a robot and another robot is still present as an idea and is not implemented in practice.

SUMMARY

It is an aspect of the present invention to provide a method of performing conversation between robots without error and a robot implementing the same.

The above and other aspects and advantages of the present invention will become apparent from the detailed description of the following embodiments in conjunction with the accompanying drawings. In addition, it will be readily understood that the aspects and advantages of the present invention can be realized by features set forth in the appended claims or combinations thereof.

In accordance with one aspect of the present invention, an robot capable of conversation includes: a main body having a first region corresponding to a human face and rotatable in left-right direction directions; a signal generator generating a first data signal to be transmitted to a listener robot and a first robot voice signal corresponding to the first data signal; a communication unit transmitting the first data signal to an external server; a speaker outputting the first robot voice signal; and a controller controlling a rotation direction of the main body such that the first region is directed toward the listener robot at a time point adjacent to a transmission time of the first data signal and controlling the speaker to output the first robot voice signal after the rotation direction of the robot is controlled, wherein the listener robot receives the first data signal transmitted from the external server and is controlled to operate based on the first data signal.

In accordance with another aspect of the present invention, an robot capable of conversation includes: a main body having a first region corresponding to a human face and rotatable in left-right direction directions: a communication unit receiving a first data signal transmitted from a speaker robot through an external server, the first data signal controlling operation of the robot; a microphone receiving a first robot voice signal output from the speaker robot and corresponding to the first data signal; a signal generator generating a second data signal based on the first data signal in response to the first data signal and a second robot voice signal corresponding to the second data signal; a speaker outputting the second robot voice signal; and a controller controlling the main body, the communication unit and the speaker, wherein the controller controls a rotation direction of the main body such that the first region is directed toward the speaker robot, controls the communication unit to transmit the second data signal, and controls the speaker to output the second robot voice signal, upon receiving both the first data signal and the first robot voice signal.

In accordance with a further aspect of the present invention, a method of controlling an robot capable of conversation includes: generating, by a signal generator, a first data signal to be transmitted to a listener robot and a first robot voice signal corresponding to the first data signal; transmitting, by a communication unit, the first data signal to an external server; controlling, by a controller, a rotation direction of a main body having a first region corresponding to a human face such that the first region is directed toward the listener robot at a time point adjacent to a transmission time of the first data signal; and outputting, by a speaker, the first robot voice signal after the rotation direction of the robot is controlled, wherein the listener robot receives the first data signal transmitted from the external server and is controlled to operate based on the first data signal.

Embodiments of the present invention provide an advantage of allowing conversation between robots without error.

It should be understood that the present invention is not limited to the effects described above and various other effects of the present invention can be easily conceived from the features of the present invention by those skilled in the art.

DRAWINGS

DETAILED DESCRIPTION

Figure 1:
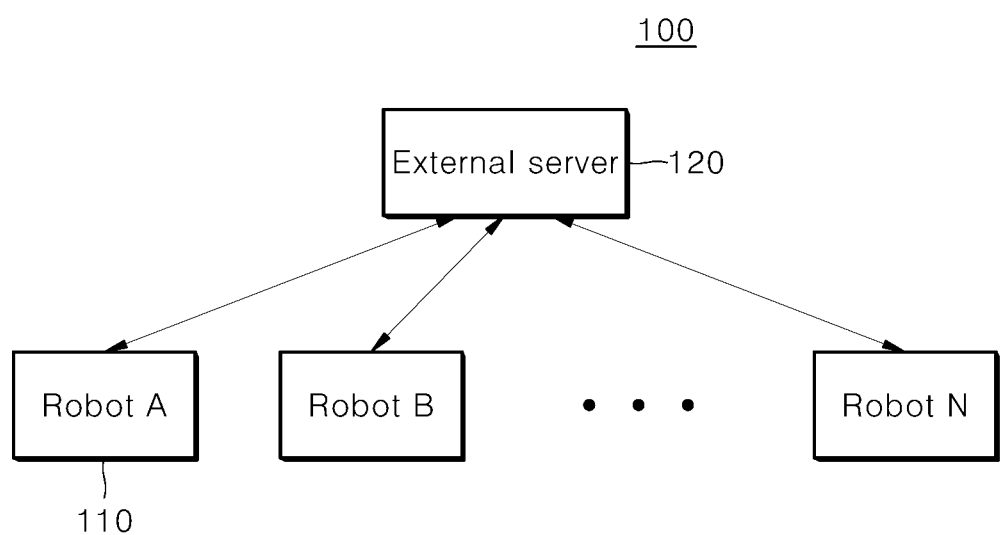
FIG. 1 is a schematic diagram of a robot conversation system according to one embodiment of the present invention.

Hereinafter, embodiments of the present invention will be described with reference to the accompanying drawings such that the present invention can be easily implemented by those skilled in the art. It should be understood that the present invention may be embodied in different ways and is not limited to the following embodiments.

In the drawings, portions irrelevant to the description will be omitted for clarity. Like components will be denoted by like reference numerals throughout the specification. Further, some embodiments of the present invention will be described in detail with reference to the exemplary drawings. Here, like reference numerals are used to denote like elements even when the elements are shown in different drawings. Description of known functions and constructions which may unnecessarily obscure the subject matter of the present invention will be omitted.

It will be understood that, although the terms "first", "second", "A", "B", "(a)", "(b)", etc. may be used herein to describe various elements, components, regions, layers and/or sections, the nature, order, sequence, or number of these elements, components, regions, layers and/or sections should not be limited by these terms. These terms are only used to distinguish one element, component, region, layer or section from another element, component, region, layer or section. In addition, when an element or component is referred to as being "on," "connected to," or "coupled to" another element or component, it may be directly on, connected to, or coupled to the other element or component or intervening elements or components may be present.

It will be understood that, although components may be individually described in each embodiment of the present invention for convenience of explanation, these components may be implemented as one device or module, or one component may be commonly implemented in plural devices or modules.

Herein, the term "robot" collectively refers to a machine that performs a specific function and travels in a specific region. Functions performed by the robot include various functions that a mobile device can provide, such as cooking, cleaning, guidance, map making, and security functions.

FIG. 1 is a schematic diagram of a robot conversation system according to one embodiment of the present invention.

Referring to FIG. 1, a robot conversation system 100 according to one embodiment of the invention includes a plurality of robots 110 and an external server 120.

The plural robots 110 are placed in a certain space to perform specific functions. Here, the functions performed by the robots commonly refer to various functions such as cooking, cleaning, guidance, and the like. By way of example, the plural robots 110 placed in a certain space may include a home robot, a cooking robot, a cleaning robot, a delivery robot, and the like.

In particular, a robot 110 may perform a particular operation to make conversation with another robot 110 or a user of the robot 110. In particular, the robot 110 may transmit certain information to the other robot 110 through conversation and the other robot 110 may be controlled by the certain information.

The external server 120 is communicatively connected to the plural robots 110 and serves as an intermediary that relays conversation between the robots 110. Further, the external server 120 may generate additional information corresponding to certain information related to the conversation to transmit the generated information to the other robot 110, which in turn may be controlled additionally using the additional information.

Figure 2:
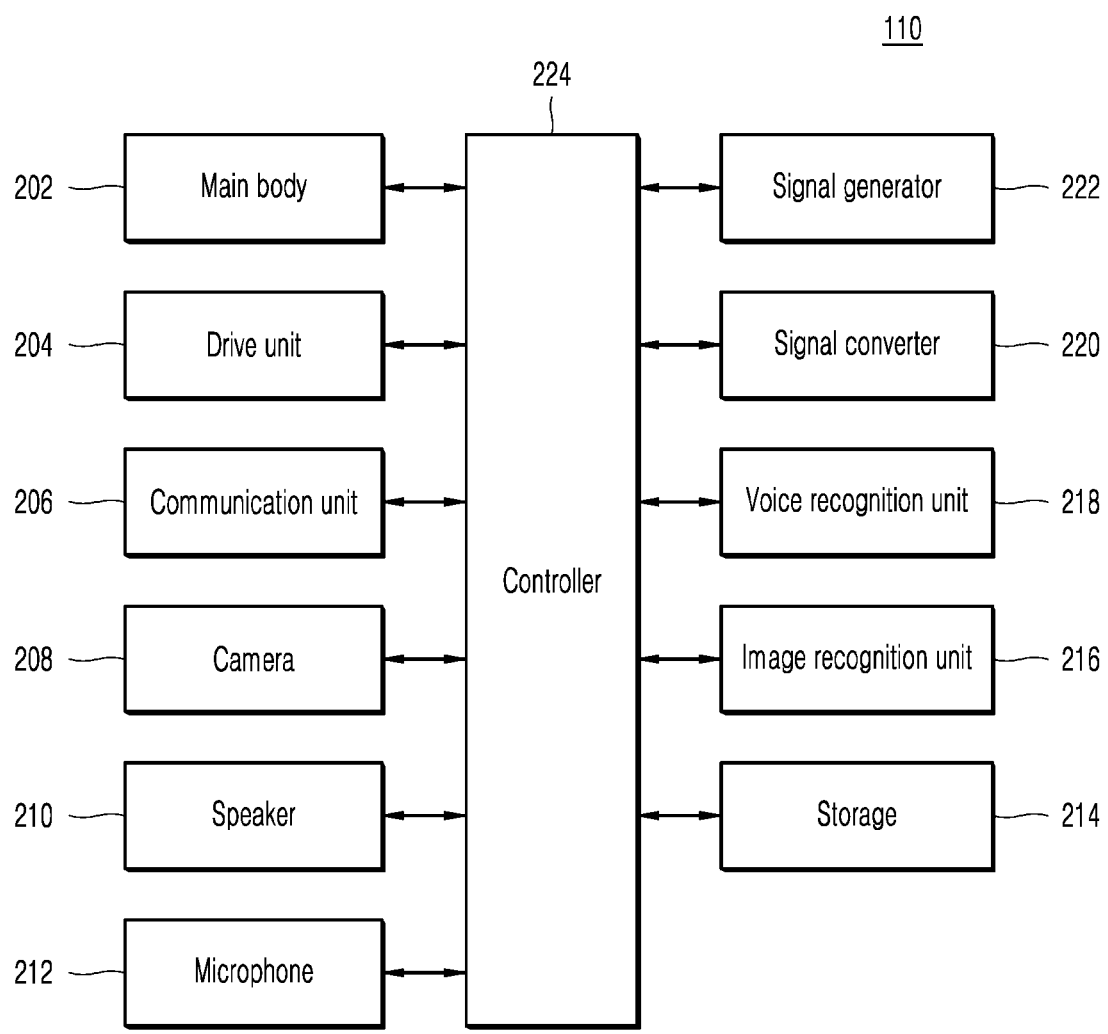
FIG. 2 is a schematic block diagram of a robot according to one embodiment of the present invention.

FIG. 2 is a schematic block diagram of a robot 110 according to one embodiment of the present invention.

Referring to FIG. 2, the robot 110 includes a main body 202, a drive unit 205, a communication unit 206, a camera 208 a speaker 210, a microphone 212, a storage 214, an image recognition unit 216, a voice recognition unit 218, a signal converter 220, a signal generator 222, and a controller 224.

Figure 3:
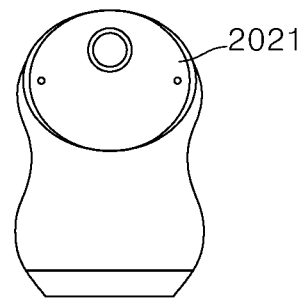
FIG. 3 shows one example of an external appearance of the robot according to the embodiment of the present invention.
Figure 3:
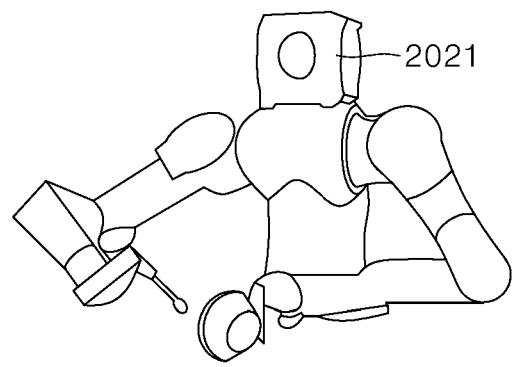
Figure 3:
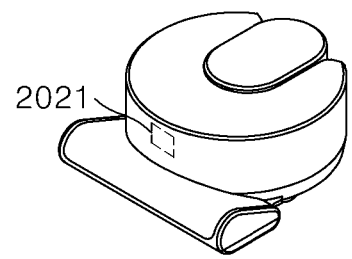

FIG. 3 shows one example of an external appearance of the robot 100 according to the embodiment of the present invention. That is, FIG. 3 shows the external appearances of a home robot 310, a cooking robot 320 and a cleaning robot 330 including the components described with reference to FIG. 2.

Hereinafter, functions of each component will be described in detail.

The main body 202 is rotatable in rightwards and leftwards directions and has a first region 2021 corresponding to the human face. Hereinafter, for convenience of description, the first region 2021 will be referred to as "face region". In addition, the main body 202 can be tilted upwards and downwards.

The drive unit 205 is provided with devices, such as an actuator, a motor, a wheel, a brake, a propeller, and the like. With these devices, the robot 110 can move while performing various physical operations.

The communication unit 206 communicates with the external server 120 and the other robot 110. Here, the communication unit 206 may include a mobile communication module, a short range communication module, and the like.

The mobile communication module transmits and receives a wireless signal with respect to at least one of a base station, an external terminal device, and a communication server on a mobile communication network constructed according to a technical standard or communication scheme for mobile communication, for example, GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), and the like.

The short range communication module is provided for short range communication and may include at least one of Bluetooth™, RFID (Radio Frequency Identification), Infrared Data Association (IrDA), UWB (Ultra Wideband), Zig-Bee, NFC (Near Field Communication), Wi-Fi, Wi-Fi Direct, and Wireless USB (Wireless Universal Serial Bus) techniques.

The camera 208 acquires an image of a space. By way of example, the camera 208 may be attached to the face region 2021 and thus may also be rotated.

The speaker 210 may output a robot voice signal generated from the robot 110. Here, the robot voice signal is generated from the signal generator 222 and the volume of the speaker 210 may be controlled by the controller 224.

The microphone 212 receives a user voice signal output from a user and the robot voice signal received from another robot 110 and processes the voice signals into electrical voice data signals.

The storage 214 stores at least one of information related to a space where the robot 110 is located, user schedule information, and user behavior history information. This information may be directly input to the storage by a user or may be transmitted through a mobile terminal device (for example, a smartphone) possessed by the user. In particular, the information related to the space may be stored therein by analyzing an image acquired through the camera 208.

Each of the image recognition unit 216, the voice recognition unit 218, the signal converter 220, the signal generator 222 and the controller 224 may be a processor-based module. Here, the processor may include at least one of a central processing unit, an application processor and a communication processor.

The image recognition unit 216 processes an image acquired by the camera 208 to determine whether a user is present in the image. In addition, the image recognition unit 216 recognizes user behavior through recognition of a user expression and gesture and generates user behavior information if it is determined that a user is present in the image.

The voice recognition unit 218 recognizes a voice signal acquired by the microphone 212. That is, the voice recognition unit 218 processes information contained in the user voice signal output from a user through analysis of the information in the user voice signal.

The signal converter 220 converts the robot voice signal output from the other robot 110 into a user voice signal.

That is, the robot 110 treats the robot voice signal as noise unlike the user voice signal and thus cannot extract information from the robot voice signal. Accordingly, the signal converter 220 converts the robot voice signal received by the microphone 212 into the user voice signal through frequency adjustment.

The signal generator 222 generates a data signal related to conversation between the robots 110 (hereinafter referred to as "conversation data signal" for convenience of description) and a robot voice signal corresponding to the content of the generated data signal. The generated robot voice signal include the same information as the conversation data signal. As described above, the conversation data signal may be used to control operation of the robot 110 receiving conversation.

The controller 224 may control at least one component of the robot 110 or may perform data signal processing or calculation related to communication. In particular, the controller 224 may control the components of the robot, such as the main body 202, the speaker 210, and the like, to perform conversation between the robots 110 and between a user and the robot 110.

Although not shown in FIG. 2, the robot 110 may further include a sensing unit. The sensing unit acquires inner information and surrounding information of the robot 110 using various sensors thereof. By way of example, the sensing unit may include a proximity sensor, an illumination sensor, a touch sensor, an acceleration sensor, a magnetic sensor, a gravity sensor, a gyroscope sensor, a motion sensor, an RGB sensor, an infrared sensor, a fingerprint sensor, an ultrasonic sensor, an optical sensor, a radar sensor, light detection and ranging (LiDAR), a radar, and the like.

Figure 4:
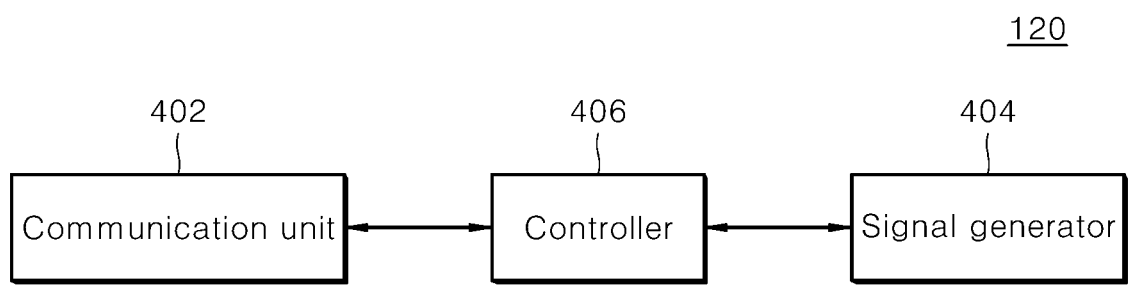
FIG. 4 is a schematic block diagram of an external server according to one embodiment of the present invention.

FIG. 4 is a schematic block diagram of an external server 120 according to one embodiment of the present invention.

Referring to FIG. 4, the external server 120 includes a communication unit 402, a signal generator 404, and a controller 406.

Hereinafter, functions of each component will be described in detail.

The communication unit 402 is communicatively connected to the plural robots 110 and may include a mobile communication module, a short range communication module, and the like.

In particular, the communication unit 402 transmits a conversation data signal for conversation between the robots 110. That is, in conversation between two robots 110, the communication unit 402 receives a conversation data signal from a speaker robot and transmits the conversation data signal to a listener robot.

The signal generator 404 generates a first additional data signal related to the conversation data signal. The first additional data signal is transmitted together with the conversation data signal to the listener robot and may also be used to control operation of the listener robot.

The controller 406 may control at least one component of the external server 120 or may perform data signal processing or calculation related to communication.

Next, a process of conversation between robots will be described in more detail.

Figure 5:
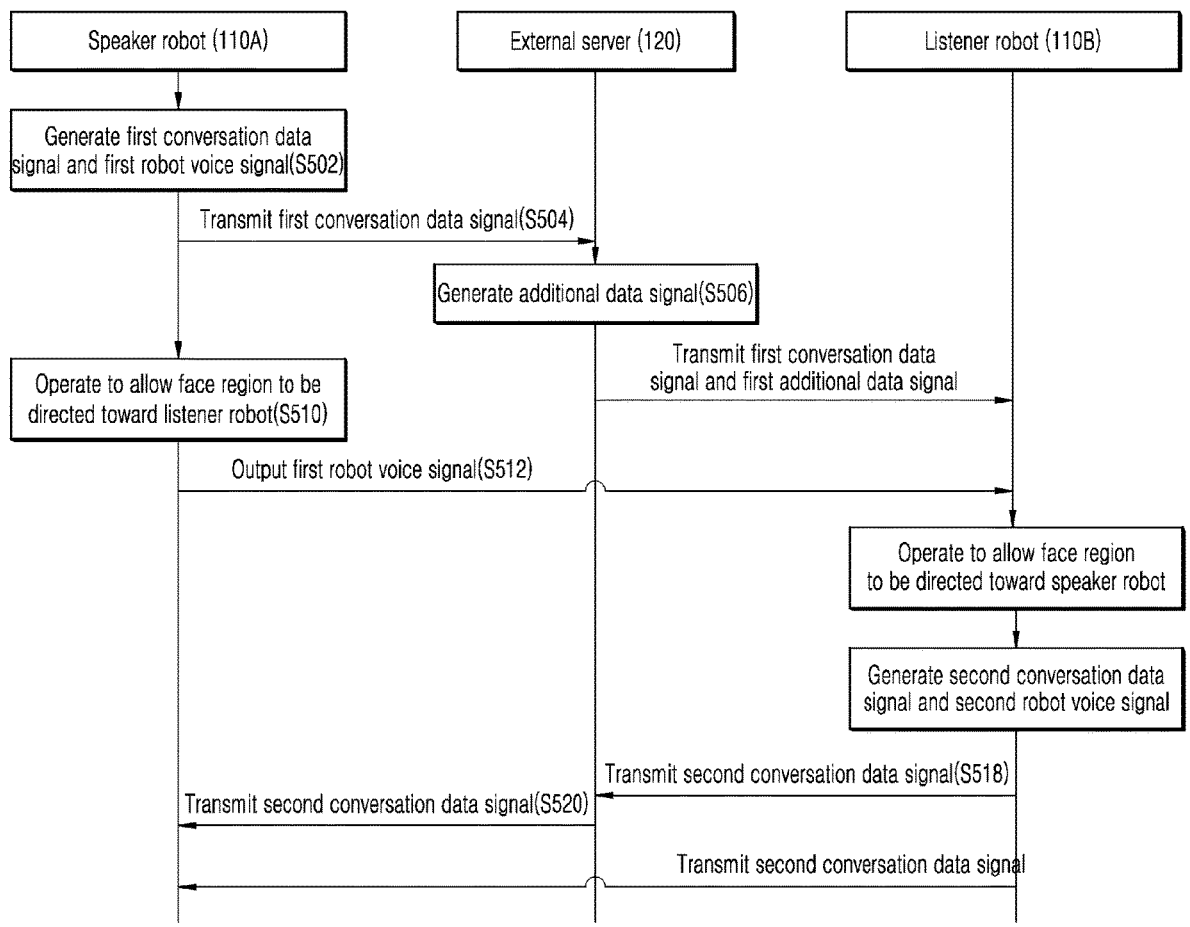
FIG. 5 is a flowchart of a conversation method between robots according to one embodiment of the present invention.

FIG. 5 is a flowchart of a conversation method between robots according to one embodiment of the present invention.

In order to differentiate components of a speaker robot 110A from components of a listener robot 110B, the word "first" is used in front of the components of the speaker robot 110A, the word "second" is used in front of the components of the listener robot 110A, and the word "third" is used in front of the components of the external server 120.

First, the speaker robot 110A generates a first conversation data signal to be transmitted to the listener robot 110B and a first robot voice signal corresponding to the first conversation data signal (S502). These signals are generated from a first signal generator 222.

By way of example, in the case where the speaker robot 110A is a home robot and the listener robot 110B is a cooking robot, the first signal generator 222 may generate a first conversation data signal including a command of "prepare dinner" and a first robot voice signal "please make dinner" corresponding to the first conversation data signal.

The first conversation data signal may be generated based on various pieces of information.

According to one embodiment, the first signal generator 222 may generate the first conversation data signal based on user behavior in an image acquired through a first camera 208 and a user voice signal received by a first microphone 212.

By way of example, the speaker robot 110A observes a space through the first camera 208 and a first image recognition unit 216 analyzes an image acquired by the first camera 208 to recognize whether a user looks at the speaker robot 110A. When the user looks at the speaker robot 110A, the first voice recognition unit 218 is operated.

Then, when the user outputs a user voice signal "I want to have dinner at 6", the user voice signal is received through a first microphone 212 and a first voice recognition unit 218 recognizes the user voice signal. Then, the first signal generator 222 may generate a first conversation data signal including a command of "prepare dinner" based on the recognized user voice signal.

By way of another example, the speaker robot 110A outputs a robot voice command "I can prepare spaghetti. How about spaghetti?" through the first speaker 210, and acquires a user image through the first camera 208. Then, the first image recognition unit 216 recognizes that the user makes an affirmative response (for example, moving the face up and down, an affirmative face expression, and the like), and the first signal generator 222 may generate a first conversation data signal including a command of "prepare spaghetti" based on the recognized user behavior information.

According to another embodiment, the speaker robot 110A may generate a first conversation data signal based on at least one of information related to a space where the robot is located, user schedule information, and user behavior history information, which are stored in a first storage 214.

By way of example, the speaker robot 110A may receive and store the user schedule information through a mobile terminal device of the user. If the user is not present in the space and the current time is 6 pm, the first signal generator 222 may generate a first conversation data signal including a command of "prepare dinner" based on the stored user schedule information.

By way of another example, the speaker robot 110A may analyze and store space information related to a space, such as information on current ingredients, through analysis of an image acquired through the mobile terminal device of the user or through the first camera 208. Here, the first signal generator 222 may generate a first conversation data signal including a command of "prepare dinner using current ingredients" based on the stored space information.

By way of another example, the speaker robot 110A stores user behavior history information, such as a menu of past dinner, which was eaten for a week as an example of a preset time interval. Here, the signal generator 222 may generate a first conversation data signal based on the user behavior history information.

Next, the first communication unit 206 of the speaker robot 110A transmits the first conversation data signal to the external server 120 (S504).

Next, a third signal generator 404 of the external server 120 generates a first additional data signal corresponding to the first conversation data signal (S506) and a third communication unit 404 of the external server 120 transmits the first conversation data signal and the first additional data signal to the listener robot 110B (S508). On the other hand, when the first additional data signal is not generated, step S506 is omitted and the external server 120 transmits only the first conversation data signal to the listener robot 110B.

The first additional data signal may be a data signal for supplementing the first conversation data signal for controlling the operation of the listener robot 110B. By way of example, when the first conversation data signal includes the contents of "an ingredient list, the amount of meals to be prepared, and a meal start time", the first additional data signal generated by the external server 120 may include a data signal including "a menu and recipe to be prepared based on the ingredient list, cooking, time", and the like.

On the other hand, at a time point adjacent to a transmission time of the first conversation data signal, the speaker robot 110A operates to allow the face area 2021 of the main body 202 to be directed toward the listener robot 110B (S510). In addition, the first speaker 210 of the speaker robot 110A outputs a first robot voice signal after the rotation direction is controlled (S512). This operation is controlled by the first controller 224 of the speaker robot 110A. Further, location information of the listener robot 110B may be previously input to the speaker robot 110A or may be extracted through analysis of the image acquired by the first camera 208.

Then, the listener robot 110B receives the first conversation data signal (or the first conversation data signal and the first additional data signal) through the second communication unit 206. In addition, the listener robot 110B having received the first robot voice signal through the second microphone 212 operates to allow a face region 2021 of the listener robot 110B to be directed toward the speaker robot 110A (S514). This operation may be controlled through the second controller 224.

In addition, a second signal generator 222 of the listener robot 110B generates a second conversation data signal based on the first conversation data signal in response to the first conversation data signal and a second robot voice signal corresponding to the second conversation data signal (S516).

By way of example, in the case where the listener robot 110B is a cooking robot, the speaker robot 110A is a home robot, and the first conversation data signal includes a command of "prepare dinner", the second signal generator 222 generates a second conversation data signal related to the "preparation of dinner by 6 pm" and a second robot voice signal "I am going to prepare dinner by 6 pm" corresponding to the second conversation data signal.

In addition, the second communication unit 206 of the listener robot 110B transmits the second conversation data signal to the external server 120 (S518). The communication unit 402 of the external server 120 transmits the received second conversation data signal to the speaker robot 110A (S520).

Then, the second speaker 210 of the listener robot 110B outputs a second robot voice signal (S522). Here, the second robot voice signal is output toward the speaker robot 110A.

In addition, the second controller 224 controls the listener robot 110B based on the first conversation data signal (or the first conversation data signal and the first additional data signal).

If the speaker robot 110A and the listener robot 110B are separated a long distance from each other, transmission of the first robot voice signal can fail. In this case, the first robot voice signal may be transmitted by a third robot (for example, cleaning robot) that is placed near the speaker robot 110A and is movable. In this case, the speaker robot 110A may operate such that the face region 2021 of the main body 202 is directed toward the third robot.

Further, after the listener robot 110B receives the first conversation data signal and the first additional data signal, a user voice signal output from the user may be received by the first microphone 212. By way of example, while the cooking robot prepares Food A in response to the first conversation data signal and the first additional data signal, the user may output a first user voice signal including information for change of food.

In this case, the second voice recognition unit 218 of the listener robot 110B recognizes the first user voice signal and the second controller 224 determines whether the content of the first conversation data signal is different from the content of the recognized first user voice signal.

If both contents are different, the second controller 224 may stop to control the operation of the listener robot 110B based on the first conversation data signal (or the first conversation data signal and the first additional data signal) and may control the operation of the listener robot 110B based on the recognized first user voice signal.

Here, the listener robot 110B requests that the external server sends a second additional data signal related to the recognized first user voice signal, and may be controlled to operate based on the second additional data signal.

That is, the second signal generator 222 generates a second additional data signal-requesting data signal related to the recognized first user voice signal and the second communication unit 206 transmits the second additional data signal-requesting data signal to the external server 120. The external server 120 generates and transmits a second additional data signal based on the second additional data signal-requesting data signal. The second communication unit 206 receives the second additional data signal and the second controller 224 controls the listener robot 110B based on the recognized first user voice signal and the second additional data signal.

As such, according to the present invention, conversation between the robots 110 is implemented through data signal processing through the external server 120 and through transmission and reception of voice signals through the speaker 210 and the microphone 212.

That is, "content delivery in conversation" is implemented through data signal processing and "conversation figure" is implemented through transmission and reception of voice signals. In addition, the robots 110 corresponding to both parties of the conversation are controlled to face each other in order to make the conversation more realistic. In particular, the robots 110 corresponding to both parties of the conversation can make conversation without error by delivering the contents of the conversation through data signal processing.

On the other hand, a communication connection between the speaker robot 110A, the listener robot 110B, and the external server 120 can be interrupted by a specific event. In this case, the conversation between the robots 110 may be performed using only the robot voice signal.

Next, a method of allowing conversation between the robots 110 using only the robot voice signal will be described.

First, the speaker robot 110A outputs the first robot voice signal through the first speaker 210 and the listener robot 110B receives the first robot voice signal through the second microphone 212 thereof.

Here, in order to allow the first robot voice signal to be more accurately delivered, the volume of the first speaker 210 may be increased. By way of example, the first controller 224 may control the first speaker 210 to increase the output intensity of the first robot voice signal based on the distance between the speaker robot 110A and the listener robot 110B.

Then, the second signal converter 220 of the listener robot 110B converts the first robot voice signal into a second user voice signal and the second voice recognition unit 218 recognizes the second user voice signal.

Then, the second controller 224 may control the operation of the listener robot 110B based on the recognized second user voice signal.

Like the aforementioned operation, the listener robot 110B may request that the external server output a third additional data signal related to the recognized second user voice signal and may be controlled to operate based on the third additional data signal.

Like the aforementioned operation, if the speaker robot 110A and the listener robot 110B are separated a long distance from each other, transmission of the first robot voice signal can fail. In this case, the first robot voice signal may be transmitted by a third robot (for example, a cleaning robot) that is placed near the speaker robot 110A and is movable.

Figure 6:
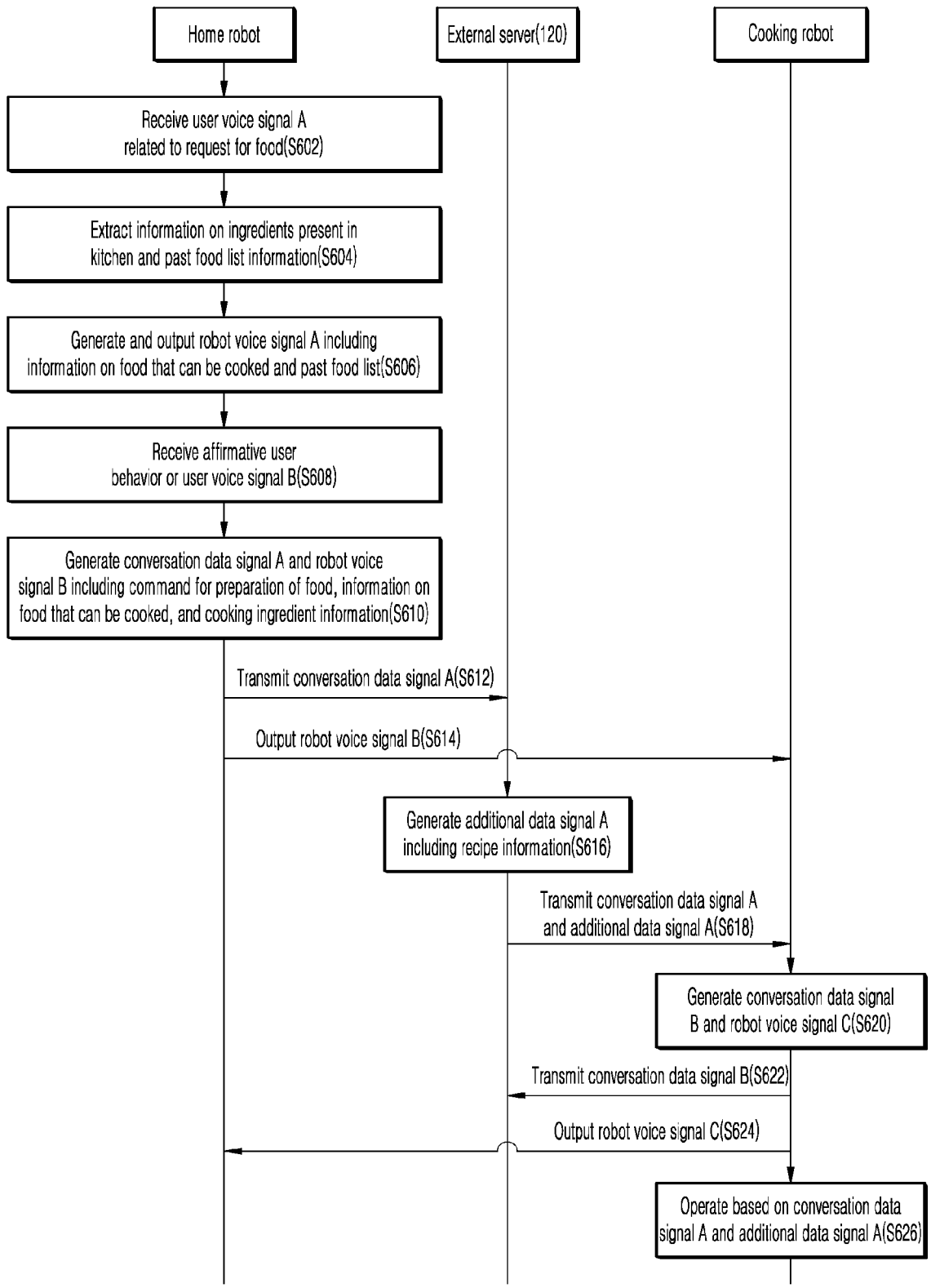
FIG. 6 is a flowchart of a conversation method between a home robot and a cooking robot according to one embodiment of the present invention.

FIG. 6 is a flowchart of a conversation method between a home robot and a cooking robotrobot according to one embodiment of the present invention.

First, the home robot receives a user voice signal A (S602). By way of example, when a user outputs a user voice signal 'Please make food', the home robot receives the user voice signal.

Then, the home robot extracts "information on ingredients present in a kitchen", which is information related to a space, and information on a past food list, which was eaten by the user for a week (that is, a preset time interval) by parsing information stored in the storage 214 (S604).

Then, the home robot generates a robot voice signal A using the cooking ingredient information and the past food list information and outputs the robot voice signal A in a direction in which the user is located (S606). Information included in the robot voice signal A includes information on food that can be cooked and the past food list. By way of example, the robot voice signal A includes "The food that can be cooked now is spaghetti. However, you ate spaghetti two days ago. Would you like to have spaghetti?"

Then, the home robot recognizes the behavior of the user listening to the robot voice signal A or a user voice signal B output from the user (S608). At this time, it is assumed that a user response is an affirmative behavior (for example, nodding or making a satisfactory facial expression) or an affirmative user voice signal (for example, a user voice signal "Yes", "I like it", and the like).

Then, the home robot generates a conversation data signal A and a related robot voice signal B, which include a food preparation request command, information on food that can be cooked, and cooking ingredient information (S610). In addition, the home robot transmits the conversation data signal A to the external server 120 (S612), and outputs the conversation data signal A and the robot voice signal B (S614). The operation of the robot related to this process is the same as that described above and a detailed description thereof will be omitted.

In response to the conversation data signal A, the external server 120 generates an additional conversation data signal A related to the conversation data signal A (S616), and transmits the conversation data signal A and the additional conversation data signal A to the cooking robot (S618). Here, the additional conversation data signal A includes recipe information of the food information that can be cooked.

In response to the conversation data signal A, the additional conversation data signal A and the robot voice signal B, the cooking robot generates a conversation data signal B and a robot voice signal C (S620), transmits the conversation data signal B to the external server 120 (S622), and outputs the robot voice signal C (S624). The operation of the robot related to this process is the same as that described above and a detailed description thereof will be omitted.

In addition, the cooking robot operates based on the conversation data signal A and the additional conversation data signal A (S624).

On the other hand, in step S610, when the user makes a negative response (for example, shaking his head from side to side or an angry facial expression) or outputs a negative user voice signal (for example, a user voice signal "No"), the home robot generates a robot voice signal D including information on an cooking ingredient list and outputs the robot voice signal D in a direction in which the user is located.

At this time, the user listens to the robot voice signal D and outputs a user voice signal C including additional cooking ingredient purchase information, and the home robot receives the user voice signal C. Then, the home robot generates a conversation data signal C including the additional cooking ingredient purchase information and transmits the conversation data signal C to the external server 120.

The external server 120 transmits the conversation data signal C to a delivery robot, which in turn delivers additional ingredients based on the conversation data signal C.

Although all the elements constituting the embodiments of the present invention have been described as being combined into one or combined with one another to operate, it should be understood that the present invention is not limited thereto and at least one of the elements may be selectively combined with one another to operate. Further, all the elements may be implemented as respective independent hardware devices, but some or all of the elements may also be selectively combined and implemented in the form of a computer program having program modules which perform some or all of the functions combined by one or more hardware devices. Code and code segments constituting the computer program may be easily conceived by those skilled in the art. Such a computer program is stored in computer readable storage media and is read and executed by the computer to implement the embodiments of the present invention. Examples of the storage media for storing the computer program may include magnetic recording media, optical recording media, semiconductor recording media, etc. In addition, the computer program for implementing the embodiments of the present invention includes a program module that is transmitted in real time via an external device.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

<List of Reference Numerals>

| | |
|---|---|
| 100: robot conversation system | 110: robot |
| 120: external server | 202: main body |
| 204: drive unit | 206: communication unit |
| 208: camera | 210: speaker |
| 212: microphone | 214: storage |
| 216: image recognition unit | 218: voice recognition unit |
| 220: signal converter | 222: signal generator |
| 224: controller | 310: home robot |
| 320: cooking robot | 330: cleaning robot |

What is claimed is:

1. An robot capable of conversation, the robot comprising:
a main body having a first region corresponding to a human face and rotatable in left-right direction directions;
a signal generator generating a first data signal to be transmitted to a listener robot and a first robot voice signal corresponding to the first data signal;
a communication unit transmitting the first data signal to an external server;
a speaker outputting the first robot voice signal; and
a controller controlling a rotation direction of the main body such that the first region is directed toward the listener robot at a time point adjacent to a transmission time of the first data signal, and controlling the speaker to output the first robot voice signal after the rotation direction of the robot is controlled,
wherein the listener robot receives the first data signal transmitted from the external server and is controlled to operate based on the first data signal.

2. The robot according to claim 1, wherein,
when a communication connection between the robot and the external server is interrupted such that transmission of the first data signal to the listener robot fails, the controller controls the speaker to increase output intensity of the first robot voice signal based on a distance between the robot and the listener robot.

3. The robot according to claim 1, wherein,
when a communication connection between the robot and the external server is interrupted such that transmission of the first data signal to the listener robot fails and another movable robot is located near the robot, the controller controls the rotation direction of the main body such that the first region is directed toward the another movable robot, and controls the speaker to output the first robot voice signal after control of the rotation direction of the main body, and
the first robot voice signal is transmitted to the listener robot through the another movable robot.

4. The robot according to claim 1, further comprising:
a camera acquiring an image;
an image recognition unit recognizing a user behavior in the image;
a microphone outputting a user voice signal output from the user; and
a voice recognition unit recognizing the user voice signal,
wherein the voice recognition unit performs a voice recognition operation upon recognizing that the user looks at the robot.

5. The robot according to claim 4, further comprising:
a storage storing at least one of information related to a space in which the robot is located, user schedule information and user behavior history information,
wherein the signal generator generates the first data signal based on the recognized user behavior, the recognized user voice signal, and the at least one information stored in the storage.

6. The robot according to claim 5, wherein,
the robot corresponds to a home robot and the listener robot corresponds to a cooking robot,
the information related to the space in which the robot is located is cooking ingredient information in the space, and the user behavior history information is past food list information on a past food list eaten by the user for a preset time interval.

7. The robot according to claim 6, wherein,
the signal generator generates a third robot voice signal based on the cooking ingredient information and the past food list information, and the speaker outputs the third robot voice signal in a direction in which the user is located,
the third robot voice signal includes information on food that can be cooked and the past food list information.

8. The robot according to claim 7, wherein, when the user makes an affirmative response or outputs an affirmative user voice signal in response to the third robot voice signal, the signal generator generates the first data signal including a command for preparation of food, the information on food that can be cooked, and the cooking ingredient information.

9. The robot according to claim 7, wherein, when the user makes a negative response or outputs a negative user voice signal in response to the second robot voice signal, the signal generator generates a fourth robot voice signal including cooking ingredient list information and the speaker outputs the fourth robot voice signal in a direction in which the user is located; and when the user outputs a second user voice signal including additional cooking ingredient purchase information, the signal generator generates a third data signal including the additional cooking ingredient purchase information, the communication unit transmits the third data signal to the external server, and the third data signal is transmitted to a delivery robot.

10. An robot capable of conversation, the robot comprising:
a main body having a first region corresponding to a human face and rotatable in left-right direction directions;
a communication unit receiving, a first data signal transmitted from an external server;
a microphone receiving a first robot voice signal output from a speaker robot and corresponding to the first data signal;
a signal generator generating a second data signal in response to the first data signal based on the first data signal and a second robot voice signal corresponding to the second data signal;
a speaker outputting the second robot voice signal; and
a controller controlling the main body, the communication unit, and the speaker,
wherein the controller controls a rotation direction of the main body such that the first region is directed toward the speaker robot, controls the communication unit to transmit the second data signal, and controls the speaker to output the second robot voice signal, when both the first data signal and the first robot voice signal received.

11. The robot according to claim 10, wherein,
the communication unit further receives a first additional data signal related to the first data signal from the external server, and
the controller controls operation of the robot based on the first additional data signal.

12. The robot according to claim 11, wherein,
the robot corresponds to a cooking robot and the speaker robot corresponds to a home robot,
the first data signal comprises information on food that can be cooked and cooking ingredient information, and
the first additional data signal comprises recipe information of the information on food that can be cooked.

13. The robot according to claim 11, further comprising:
a voice recognition unit recognizing a user voice signal,
wherein, when the microphone receives a first user voice signal output from the user after receiving the first data signal and the first additional data signal, the voice recognition unit recognizes the first user voice signal, and wherein the controller stops controlling of operation of the robot based on the first data signal and the first additional data signal and controls the operation of the robot based on the recognized first user voice signal when the first data signal has a different content from the recognized first user voice signal.

14. The robot according to claim 13, wherein,
the signal generator generates a data signal requesting for a second additional data signal related to the recognized first user voice signal,
the communication unit transmits the second additional data signal-requesting data signal to the external server and receives the second additional data signal from the external server, and
the controller controls the operation of the robot based on the recognized first user voice signal and the second additional data signal.

15. The robot capable of conversation according to claim 10, further comprising:
a signal converter converting a robot voice signal into a user voice signal; and
a voice recognition unit recognizing the user voice signal,
wherein, when the first data signal is not received due to interruption of a communication connection to the external server,
the signal converter converts the first robot voice signal into a second user voice signal, the voice recognition unit recognizes the second user voice signal, and the signal generator generates the second robot voice signal using the recognized second user voice signal.

16. The robot capable of conversation according to claim 15, wherein the first robot voice signal is delivered by another movable robot near the speaker robot.

17. A method of controlling a robot capable of conversation, the method comprising:
generating, by a signal generator, a first data signal to be transmitted to a listener robot and a first robot voice signal corresponding to the first data signal;
transmitting, by a communication unit, the first data signal to an external server;
controlling, by a controller, a rotation direction of a main body having a first region corresponding to a human face such that the first region is directed toward the listener robot at a time point adjacent to a transmission time of the first data signal; and
outputting, by a speaker, the first robot voice signal after the rotation direction of the robot is controlled,
wherein the listener robot receives the first data signal transmitted from the external server and is controlled to operate based on the first data signal.

* * * * *